US011502855B1

(12) United States Patent
Jerrell et al.

(10) Patent No.: US 11,502,855 B1
(45) Date of Patent: Nov. 15, 2022

(54) CERTIFICATE MIRRORING

(71) Applicant: International Business Machines Corporation, Armonk, NY (US)

(72) Inventors: Richard Ory Jerrell, Goffstown, NH (US); Mae Rockar, Hillsboro, OR (US); Galia Diamant, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/412,571

(22) Filed: Aug. 26, 2021

(51) Int. Cl.
*H04L 9/32* (2006.01)
*H04L 9/40* (2022.01)

(52) U.S. Cl.
CPC .......... *H04L 9/3268* (2013.01); *H04L 63/045* (2013.01); *H04L 63/0471* (2013.01)

(58) Field of Classification Search
CPC .. H04L 9/3268; H04L 63/045; H04L 65/0471
USPC ........................................................ 713/153
See application file for complete search history.

(56) References Cited

U.S. PATENT DOCUMENTS

| | | | | |
|---|---|---|---|---|
| 6,085,320 A * | 7/2000 | Kaliski, Jr. | ............ | G07F 7/1008 713/168 |
| 7,500,100 B1 * | 3/2009 | Kobozev | ............... | H04L 9/3263 713/168 |
| 7,650,497 B2 | 1/2010 | Thornton et al. | | |
| 7,742,605 B2 * | 6/2010 | Hornak | ............... | H04L 63/0823 726/13 |
| 8,307,203 B2 | 11/2012 | Fraleigh et al. | | |
| 8,707,043 B2 | 4/2014 | Wason et al. | | |
| 8,943,310 B2 | 1/2015 | Bell et al. | | |
| 10,382,562 B2 | 8/2019 | Yang et al. | | |
| 10,397,006 B2 | 8/2019 | Bowen | | |
| 10,834,065 B1 | 11/2020 | Natarajan et al. | | |
| 11,290,283 B2 * | 3/2022 | Juma | ..................... | H04L 9/3263 |
| 2002/0165912 A1 * | 11/2002 | Wenocur | ................. | H04L 65/80 709/203 |

(Continued)

OTHER PUBLICATIONS

Squid Web Proxy Wiki, Feature: Mimic original SSL server certificate when bumping traffic, pp. 1-6, viewed Jul. 22, 2021 https://wiki.squid-cache.org/action/print/Features/MimicSslServerCert?action=print.

(Continued)

*Primary Examiner* — Samson B Lemma
(74) *Attorney, Agent, or Firm* — Patterson + Sheridan, LLP (57) ABSTRACT

A method includes retrieving a server certificate from a server in response to a request from a client to negotiate a connection between the client and the server and generating a new server public key and a new client public key in response to the request. The method also includes generating a new server certificate using information in the server certificate. The method further includes signing the new server certificate to produce a new signed server certificate, communicating the new signed server certificate, which includes the new server public key, to the client, and generating a new client certificate using information in a client certificate received from the client. The method also includes signing the new client certificate to produce a new signed client certificate and communicating the new signed client certificate, which includes the new client public key, to the server to establish the connection.

17 Claims, 8 Drawing Sheets

(56) References Cited

U.S. PATENT DOCUMENTS

| | | | |
|---|---|---|---|
| 2003/0041110 A1* | 2/2003 | Wenocur | H04L 63/104 709/206 |
| 2006/0101510 A1 | 5/2006 | Kadyk et al. | |
| 2019/0132315 A1 | 5/2019 | Clark et al. | |
| 2021/0111905 A1* | 4/2021 | Juma | H04L 9/0894 |

OTHER PUBLICATIONS

Server Fault, "Nginx reverse proxy pass through client certificate," pp. 1-8, viewed Jul. 22, 2021 https://serverfault.com/questions/788895/nginx-reverse-proxy-pass-through-client-certificate.

B. Campbell, "Client-Cert HTTP Header: Conveying Client Certificate Information from TLS Terminating Reverse Proxies to Origin Server Applications," dated Jan. 15, pp. 1-11, Jan. 15, 2020.

Zeitoun.net, "Tricks to do client certificate authentications behind a reverse proxy," pp. 1-3, viewed Jul. 22, 2021 http://www.zeitoun.net/articles/client-certificate-x509-authentication-behind-reverse-proxy.

Kubernetes—Don't Use Certificates for Authentication—viewed Aug. 19, 2021 <https://www.tremolosecurity.com/post/kubernetes-dont-use-certificates-for-authentication>.

* cited by examiner

CERTIFICATE MIRRORING

BACKGROUND

The present invention relates to communication security, and more specifically, to using certificate mirroring to improve communication security.

SUMMARY

According to an embodiment, a method includes retrieving a server certificate from a server in response to a request from a client to negotiate a connection between the client and the server and generating a new server public key and a new client public key in response to the request. The method also includes generating a new server certificate using information in the server certificate. The method further includes signing the new server certificate to produce a new signed server certificate, communicating the new signed server certificate, which includes the new server public key, to the client, and generating a new client certificate using information in a client certificate received from the client. The method also includes signing the new client certificate to produce a new signed client certificate and communicating the new signed client certificate, which includes the new client public key, to the server to establish the connection. Other embodiments include an apparatus that performs this method.

According to another embodiment, a method includes generating a new server public key and a new client public key and generating a new server certificate using information in a server certificate retrieved from a server. The method also includes signing the new server certificate to produce a new signed server certificate and generating a new client certificate using information in a client certificate received from a client. The method further includes signing the new client certificate to produce a new signed client certificate and communicating the new signed client certificate, which includes the new client public key, to the server and the new signed server certificate, which includes the new server public key, to the client to establish a connection between the client and the server. Other embodiments include an apparatus that performs this method.

DETAILED DESCRIPTION

Man-in-the-middle (MITM) applications are used to audit or handle encrypted application traffic between a client and a server that provides services to the client. The MITM applications, however, may be difficult to implement when mutual authentication or two-way authentication is enabled between the client and the server, because the MITM application may need to handle client certificates or keys, which may expose private keys to the MITM application. This issue becomes more challenging when the server accepts multiple client certificates or keys.

This disclosure describes a computing system hosting a MITM application that performs an authentication and encryption process between a client and a server that allows for mutual authentication without exposing the server's and the client's private keys. Generally, the computing system mirrors or duplicates certificates from the server and the client and generates new public and private key pairs for the server and the client. The computing system then communicates the new certificates and new public keys to the server and the client. The server and the client may then begin encrypting traffic using the new public keys, and the computing system may act as an intermediary (e.g., serve as a MITM application) and decrypt and re-encrypt that traffic using the new private keys. As a result, the computing system can handle encrypted traffic between the client and the server without the client and server having to expose their private keys to the computing system, in certain embodiments. Additionally, the computing system can generate new certificates that are trusted by the server and the client without invalidating any inferred authentication encoded in the certificate.

Figure 1:
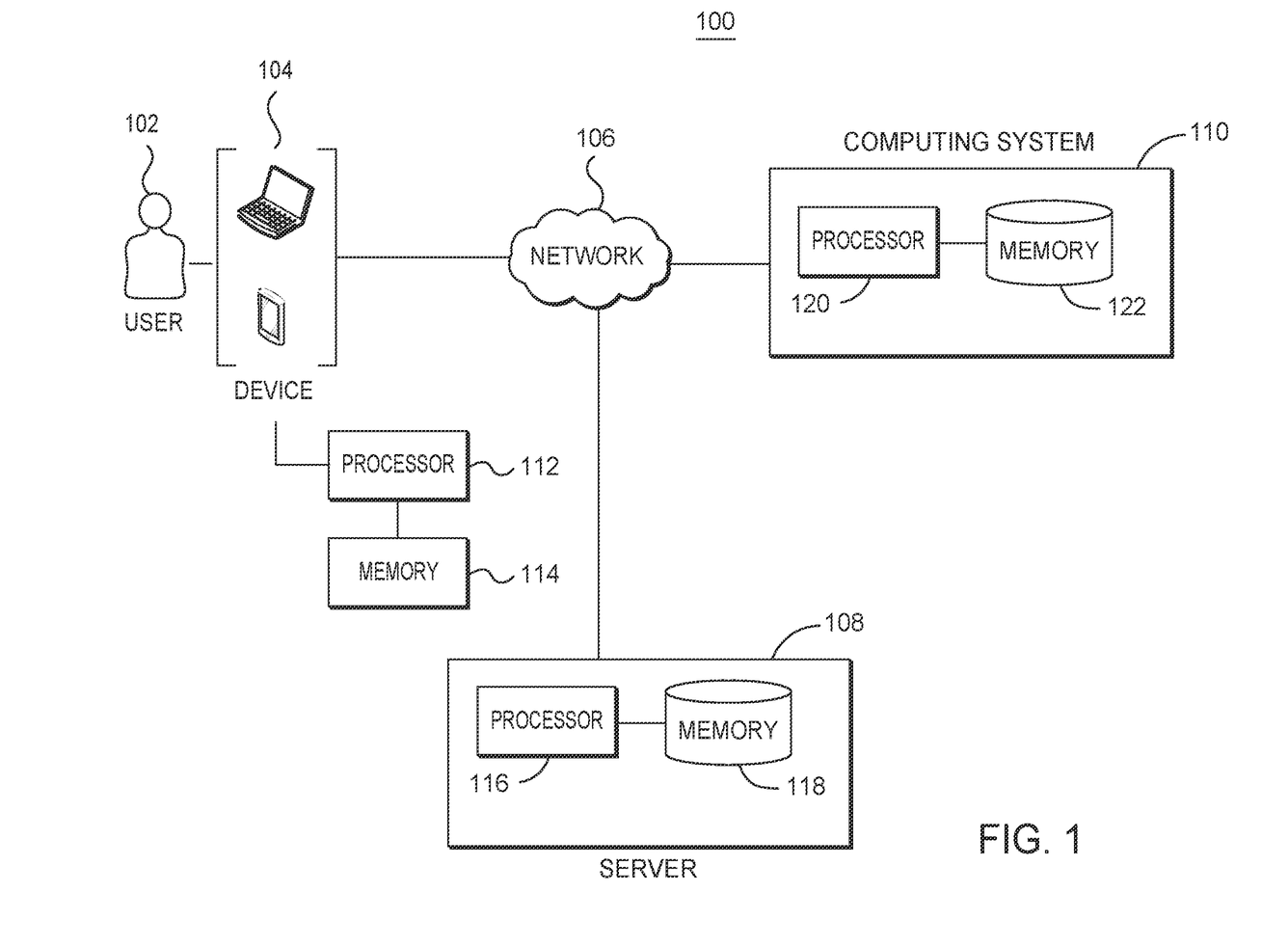
FIG. 1 illustrates an example system for certificate mirroring, according to an embodiment of the present invention.

FIG. 1 illustrates an example system 100 for certificate mirroring, according to an embodiment of the present invention. As seen in FIG. 1, the system 100 includes one or more devices 104, a network 106, one or more servers 108, and a computing system 110. Generally, the computing system 110 acts as a MITM for the device 104 and the server 108. The computing system 110 handles certificates and keys for the device 104 and the server 108, which allows for secure communication between the device 104 and the server 108. The computing system 110 generates new certificates and keys for the device 104 and the server 108 to establish a connection between the device 104 and the server 108, so that the device 104 and the server 108 do not need to expose their private keys to the computing system 110, in particular embodiments.

A user 102 uses the device 104 to interact with other components of the system 100 (e.g., the server 108 and the computing system 110). For example, the device 104 may establish a connection with the server 108 through the computing system 110 so that the server 108 can provide services to the device 104 over the connection. To establish the connection with the server 108, the device 104 may need to exchange certificates or keys with the server 108. The computing system 110 facilitates this exchange by generating new certificates and keys for the device 104 and the server 108. As a result, the device 104 and the server 108 do not expose their private keys to the computing system 110, in particular embodiments.

The device 104 is any suitable device for communicating with components of the system 100 over the network 106. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102. The device 104 includes a hardware processor 112, memory 114, or circuitry configured to perform any of the functions or actions of the device 104 described herein. For example, a software application designed using software code may be stored in the memory 114 and executed by the processor 112 to perform the functions of the device 104.

The processor 112 is any electronic circuitry, including, but not limited to one or a combination of microprocessors, microcontrollers, application specific integrated circuits (ASIC), application specific instruction set processor (ASIP), and/or state machines, that communicatively couples to memory 114 and controls the operation of the device 104. The processor 112 may be 8-bit, 16-bit, 32-bit, 64-bit or of any other suitable architecture. The processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 112 may include other hardware that operates software to control and process information. The processor 112 executes software stored on the memory 114 to perform any of the functions described herein. The processor 112 controls the operation and administration of the device 104 by processing information (e.g., information received from the network 106, server 108, computing system 110, and memory 114). The processor 112 is not limited to a single processing device and may encompass multiple processing devices.

The memory 114 may store, either permanently or temporarily, data, operational software, or other information for the processor 112. The memory 114 may include any one or a combination of volatile or non-volatile local or remote devices suitable for storing information. For example, the memory 114 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 114, a disk, a CD, or a flash drive. In particular embodiments, the software may include an application executable by the processor 112 to perform one or more of the functions described herein.

The network 106 is any suitable network operable to facilitate communication between the components of the system 100. The network 106 may include any interconnecting system capable of transmitting audio, video, signals, data, messages, or any combination of the preceding. The network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The server 108 provides any suitable type of services to the device 104 after the device 104 has established a connection with the server 108. For example, the server 108 may be a database service that provides the device 104 access to a database. The computing system 110 facilitates the exchange of messages between the device 104 and the server 108 that occurs when the device 104 and the server 108 establish a connection with each other and when the server 108 provides services to the device 104. In certain embodiments, the computing system 110 generates new certificates and keys for the device 104 and the server 108 and then uses these new certificates and keys to facilitate the exchange of messages between the device 104 and the server 108. As seen in FIG. 1, the server 108 includes a processor 116 and a memory 118, which perform the functions or actions of the server 108, described herein.

The processor 116 is any electronic circuitry, including, but not limited to one or a combination of microprocessors, microcontrollers, application specific integrated circuits (ASIC), application specific instruction set processor (ASIP), and/or state machines, that communicatively couples to memory 118 and controls the operation of the server 108. The processor 116 may be 8-bit, 16-bit, 32-bit, 64-bit or of any other suitable architecture. The processor 116 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 116 may include other hardware that operates software to control and process information. The processor 116 executes software stored on the memory 118 to perform any of the functions described herein. The processor 116 controls the operation and administration of the server 108 by processing information (e.g., information received from the device 104, network 106, computing system 110, and memory 118). The processor 116 is not limited to a single processing device and may encompass multiple processing devices.

The memory 118 may store, either permanently or temporarily, data, operational software, or other information for the processor 116. The memory 118 may include any one or a combination of volatile or non-volatile local or remote devices suitable for storing information. For example, the memory 118 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 118, a disk, a CD, or a flash drive. In particular embodiments, the software may include an application executable by the processor 116 to perform one or more of the functions described herein.

The computing system 110 serves as a MITM between the device 104 and the server 108. For example, if the server 108 is a database server, the computing system 110 may be a database protection service that stands between the device 104 and the database server. The computing system 110 generates new certificates and keys for the device 104 and the server 108 to establish a connection between the device 104 and the server 108 through the computing system 110. The computing system 110 then uses the new certificates and keys to facilitate the exchange of messages between the device 104 and the server 108. As a result, a connection between the device 104 and the server 108 may be established without the device 104 or the server 108 exposing their private keys to the computing system 110, in particular embodiments. As seen in FIG. 1, the computing system 110 includes a processor 120 and a memory 122, which perform the functions or actions of the computing system 110, described herein.

The processor 120 is any electronic circuitry, including, but not limited to one or a combination of microprocessors, microcontrollers, application specific integrated circuits (ASIC), application specific instruction set processor (ASIP), and/or state machines, that communicatively couples to memory 122 and controls the operation of the computing system 110. The processor 120 may be 8-bit, 16-bit, 32-bit, 64-bit or of any other suitable architecture. The processor 120 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 120 may include other hardware that operates software to control and process information. The processor 120 executes software stored on the memory 122 to perform any of the functions described herein. The processor 120 controls the operation and administration of the computing system 110 by processing information (e.g., information received from the device 104, network 106, server 108, and memory 122). The processor 120 is not limited to a single processing device and may encompass multiple processing devices.

The memory 122 may store, either permanently or temporarily, data, operational software, or other information for the processor 120. The memory 122 may include any one or a combination of volatile or non-volatile local or remote devices suitable for storing information. For example, the memory 122 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 122, a disk, a CD, or a flash drive. In particular embodiments, the software may include an application executable by the processor 120 to perform one or more of the functions described herein.

Figure 2A:
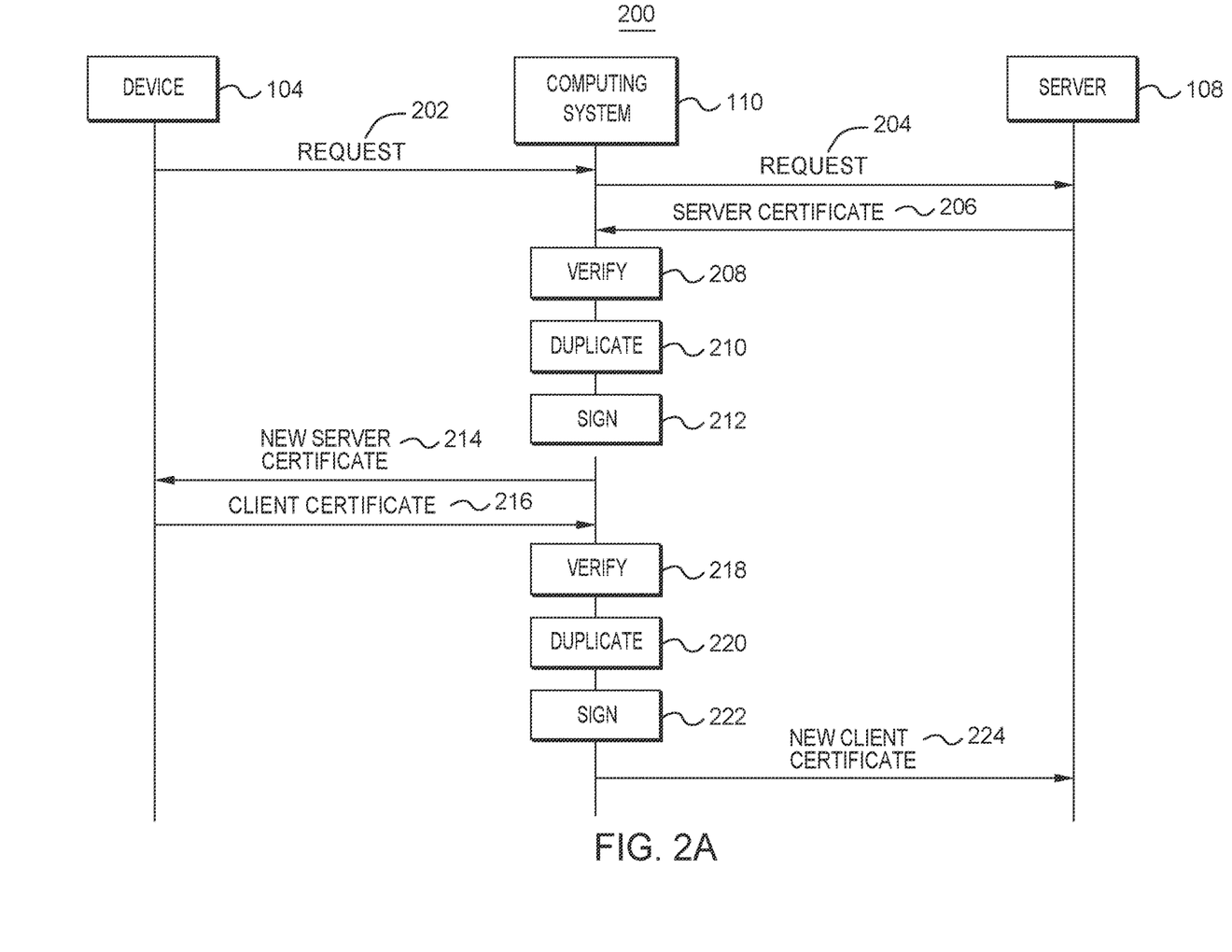
FIG. 2A illustrates an example operation performed in the system of FIG. 1.

FIG. 2A illustrates an example operation 200 of the system 100 of FIG. 1. As seen in FIG. 2A, the device 104, the server 108, and the computing system 110 perform the operation 200 to establish a connection between the device 104 and the server 108 through the computing system 110. In particular embodiments, by performing the operation 200, the connection between the device 104 and the server 108 is established without exposing the private keys of the device 104 and the server 108 to the computing system 110.

The device 104 begins the operation 200 by communicating a request 202 to the computing system 110. The request 202 may be a request to establish a connection between the device 104 and the server 108. The computing system 110 receives the request 202 and in response, communicates a request 204 to the server 108. The request 204 may be a request for the server 108 to return a server certificate 206 to the computing system 110.

In response to the request 204, the server 108 communicates the server certificate 206 to the computing system 110. The server certificate 206 may include an old server public key that was previously generated as part of a pair of old public and private keys for the server 108. The server 108 communicates the old server public key to other components of the system 100 so that these components may use the old server public key to encrypt messages intended for the server 108 and to decrypt messages that were encrypted by the server 108 using the old server private key. The server certificate 206 may identify the server 108 as the owner of the old server public key. The server certificate 206 may also be signed by a certificate authority that indicates that the server certificate 206 and the old server public and/or private keys may be trusted.

After receiving the server certificate 206, the computing system 110 verifies the server certificate 206 in block 208. In some embodiments, the computing system 110 communicates the server certificate 206 to a certificate authority that verifies the server certificate 206. Verification may involve analyzing the server certificate 206 to determine whether the server certificate 206 is valid and signed.

After the server certificate 206 is verified, the computing system 110 performs a duplication process in block 210. During the duplication process, the computing system 110 generates a new server certificate 214 using information in the server certificate 206. For example, the computing system 110 may copy information from the server certificate 206 into the new server certificate 214. Although information from the server certificate 206 is copied into the new server certificate 214, the new server certificate 214 may not be completely identical to the server certificate 206. Additionally, during the duplication process, the computing system 110 generates new server public and private keys for the server 108. The computing system 110 may use the new server private key to encrypt messages from the server 108 to the device 104.

After the new server certificate 214 and the new server public and private keys are generated, the computing system 110 signs the new server certificate 214 in block 212. In certain embodiments, the computing system 110 signs the new server certificate 214 using an intermediate signing certificate received from a certificate authority that is trusted by both the device 104 and the server 108. Because the intermediate signing certificate was issued by the certificate authority trusted by both the device 104 and the server 108, the intermediate signing certificate delegates trust from the certificate authority to the computing system 110. As a result, both the device 104 and the server 108 will trust the new server certificate 214 signed by the intermediate signing certificate.

After signing the new server certificate 214, the computing system 110 communicates the new server certificate 214 to the device 104. The new server certificate 214 may include the new server public key generated during the duplication process in block 210. The device 104 may then use the new server public key to decrypt messages that were encrypted using the new server private key. After receiving the new server certificate 214, the device 104 communicates a client certificate 216 to the computing system 110. The client certificate 216 may include an old client public key that was previously generated as part of a pair of public and private keys for the device 104. The client certificate 216 may identify the device 104 as the owner of the old client public key.

After receiving the client certificate 216, the computing system 110 verifies the client certificate 216 in block 218. The computing system 110 may verify the client certificate 216 by communicating the client certificate 216 to a certificate authority that issued the client certificate 216. The certificate authority may analyze and verify that the client certificate 216 is valid.

After the client certificate 216 is verified, the computing system 110 performs the duplication process in block 220.

During the duplication process, the computing system 110 generates a new client certificate 224 using information from the client certificate 216. For example, the computing system 110 may copy information from the client certificate 216 into the new client certificate 224. Although information from the client certificate 216 is copied into the new client certificate 224, the new client certificate 224 may not be completely identical to the client certificate 216. Additionally, during the duplication process, the computing system 110 generates a pair of new client public and private keys for the device 104. The computing system 110 may use the new client private key to encrypt messages from the device 104 to the server 108. The computing system 110 then signs the new client certificate 224 in block 222. In certain embodiments, the computing system 110 signs the new client certificate 224 using the intermediate signing certificate from the certificate authority trusted by both the device 104 and the server 108. As a result, the device 104 and the server 108 will trust the new client certificate 224.

The computing system 110 then communicates the new client certificate 224 to the server 108. In certain embodiments, the new client certificate 224 includes the new client public key generated by the computing system 110. The server 108 may use the new client public key to decrypt messages encrypted using the new client private key.

The example operation 200 was initiated by the device 104 communicating a request 202 to establish a connection with the server 108. This disclosure also contemplates that an operation that mirrors the operation 200 may be performed in the system 100 when the server 108 communicates a request to establish a connection with the device 104. For example, the server 108 may communicate the request to the computing system 110, which then retrieves the client certificate 216 from the device 104. The computing system 110 then verifies the client certificate 216 in block 218, performs the duplication process in block 220, signs the new client certificate 224 in block 222, and then communicates the new client certificate, which includes the new client public key, to the server 108. The computing system 110 then receives the server certificate 206 from the server 108, verifies the server certificate 206 in block 208, performs the duplication process in block 210, signs the new server certificate 214 in block 212, and communicates the new server certificate 214, which includes the new server public key, to the device 104.

Figure 2B:
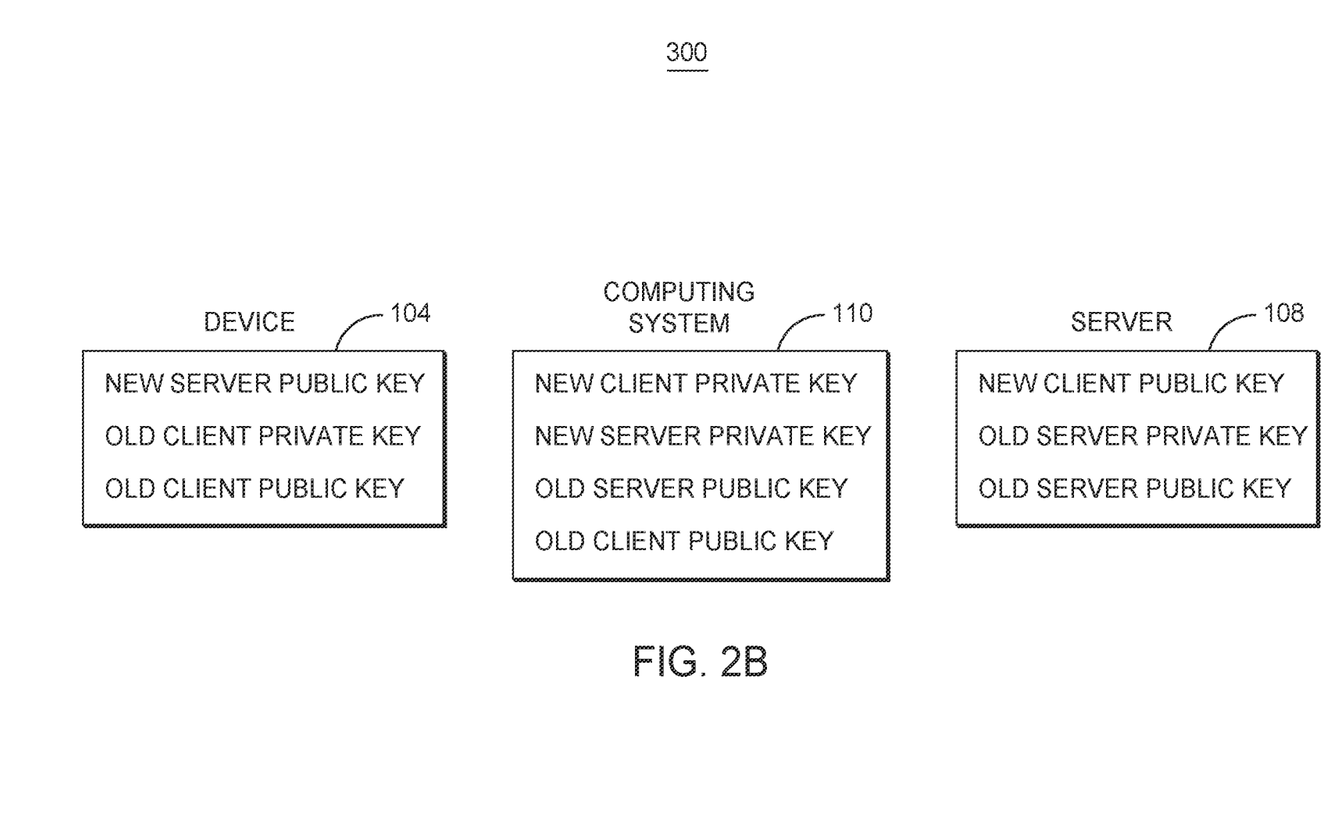
FIG. 2B illustrates example components of the system of FIG. 1.

FIG. 2B illustrates example components of the system 100 of FIG. 1 with the keys that are maintained at each component after performing the operation 200. As seen in FIG. 2B, each of the device 104, the server 108, and the computing system 110 maintains public and private keys after performing the operation 200. The device 104, the server 108, and the computing system 110 may use any of these keys to encrypt or decrypt messages.

After performing the operation 200, the device 104 has the new server public key, the old client private key, and the old client public key. The device 104 received the new server public key from the computing system 110. The new server public key may have been included in the new server certificate 214 communicated by the computing system 110 to the device 104. The old client private key and the old client public key may have been generated for the device 104 prior to performing the operation 200. The device 104 may communicate the old client public key to other components of the system 100 so that those components may decrypt messages that were encrypted by the device 104 using the old client private key. For example, the device 104 may have communicated the old client public key to the computing system 110 when the device 104 communicated the client certificate 216 to the computing system 110.

The server 108 has the new client public key, the old server private key, and the old server public key. The server 108 received the new client public key from the computing system 110 when the computing system 110 communicated the new client certificate 224 to the server 108. The old server private key and the old server public key may have been generated for the server 108 prior to performing the operation 200. The server 108 may communicate the old server public key to other components of the system 100 so that those components may decrypt messages encrypted by the server 108 using the old server private key. For example, the server 108 may communicate the old server public key to the computing system 110 when the server 108 communicated the server certificate 206 to the computing system 110.

The computing system 110 has the new client private key, the new server private key, the old server public key, and the old client public key. The computing system 110 may have generated the new client private key and the new server private key during the duplication processes in blocks 210 and 220, shown in FIG. 2A. The computing system 110 may use the new client private key and the new server private key to encrypt messages for the device 104 and the server 108. The computing system 110 may have received the old server public key from the server 108 when the server 108 communicated the server certificate 206 to the computing system 110. The computing system 110 may have received the old client public key from the device 104 when the device 104 communicated the client certificate 216 to the computing system 110. The computing system 110 may use the old server public key and the old client public key to encrypt or decrypt messages from the device 104 and the server 108.

Although FIG. 2B shows various components of the system 100 storing different keys, the keys stored by these components is not limited to those shown in FIG. 2B. The components of the system 100 may store any suitable number of keys. For example, the computing system 110 may also store the new client public key and the new server public key. As another example, the device 104 may also store the old server public key, and the server 108 may also store the old client public key.

Figure 3A:
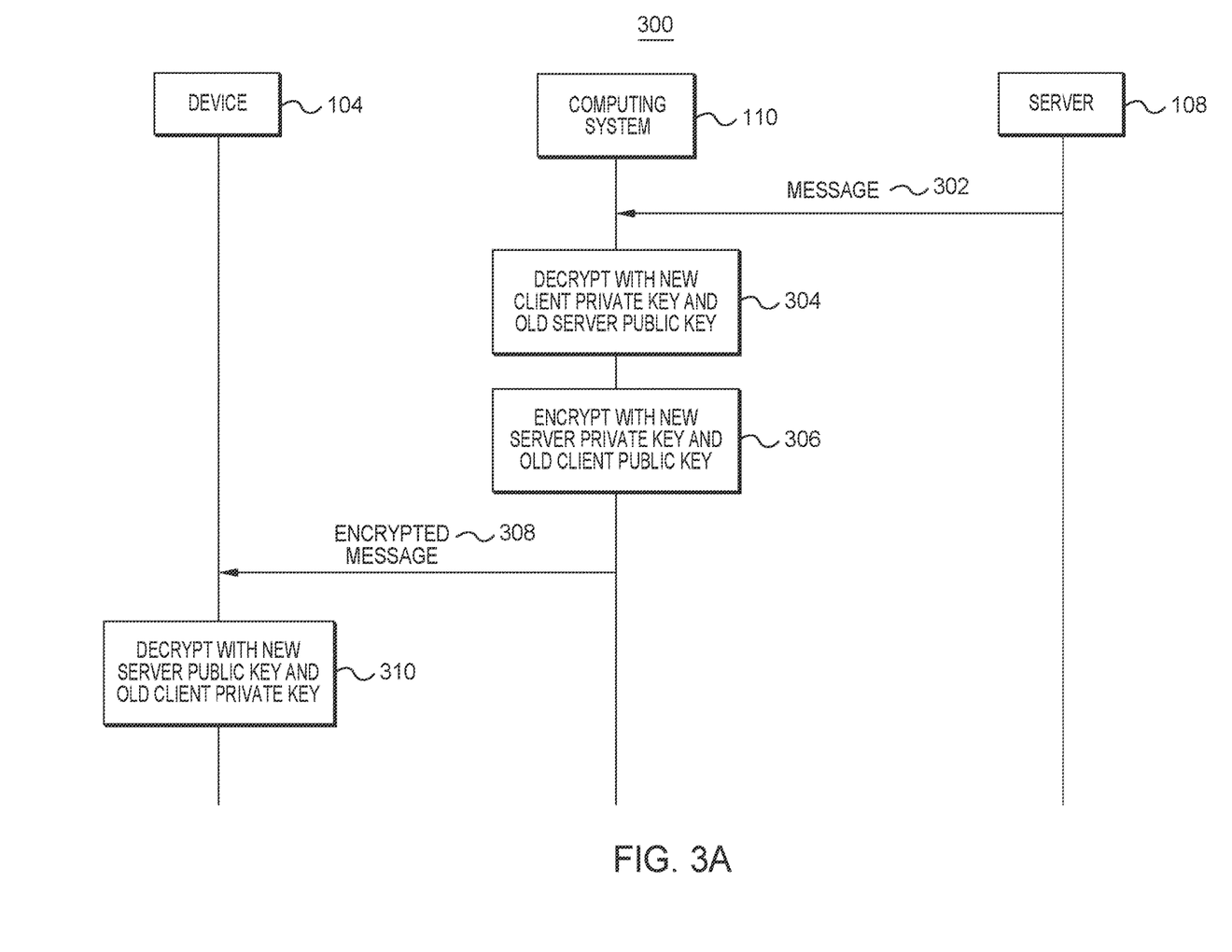
FIG. 3A illustrates an example operation performed in the system of FIG. 1.

FIG. 3A illustrates an example operation 300 of the system 100 of FIG. 1. The device 104, the server 108, and the computing system 110 perform the operation 300. By performing the operation 300, the computing system 110 decrypts and encrypts messages from the server 108 to the device 104.

The operation 300 begins when the server 108 communicates a message 302 to the computing system 110. The server 108 has encrypted the message 302 using the old server private key and the new client public key. The computing system 110 receives the message 302 and decrypts the message 302 in block 304 to generate an intermediate message. The computing system 110 decrypts the message 302 using the new client private key and the old server public key. The computing system 110 then encrypts the intermediate message in block 306. The computing system 110 encrypts the intermediate message using the new server private key and the old client public key to generate an encrypted message 308. The computing system 110 then communicates the encrypted message 308 to the device 104. The device 104 receives the encrypted message 308 and decrypts the encrypted message 308 in block 310. The device 104 decrypts the encrypted message 308 using the new server public key and the old client private key. After decrypting the encrypted message 308, the device 104 may analyze the contents of the message.

Figure 3B:
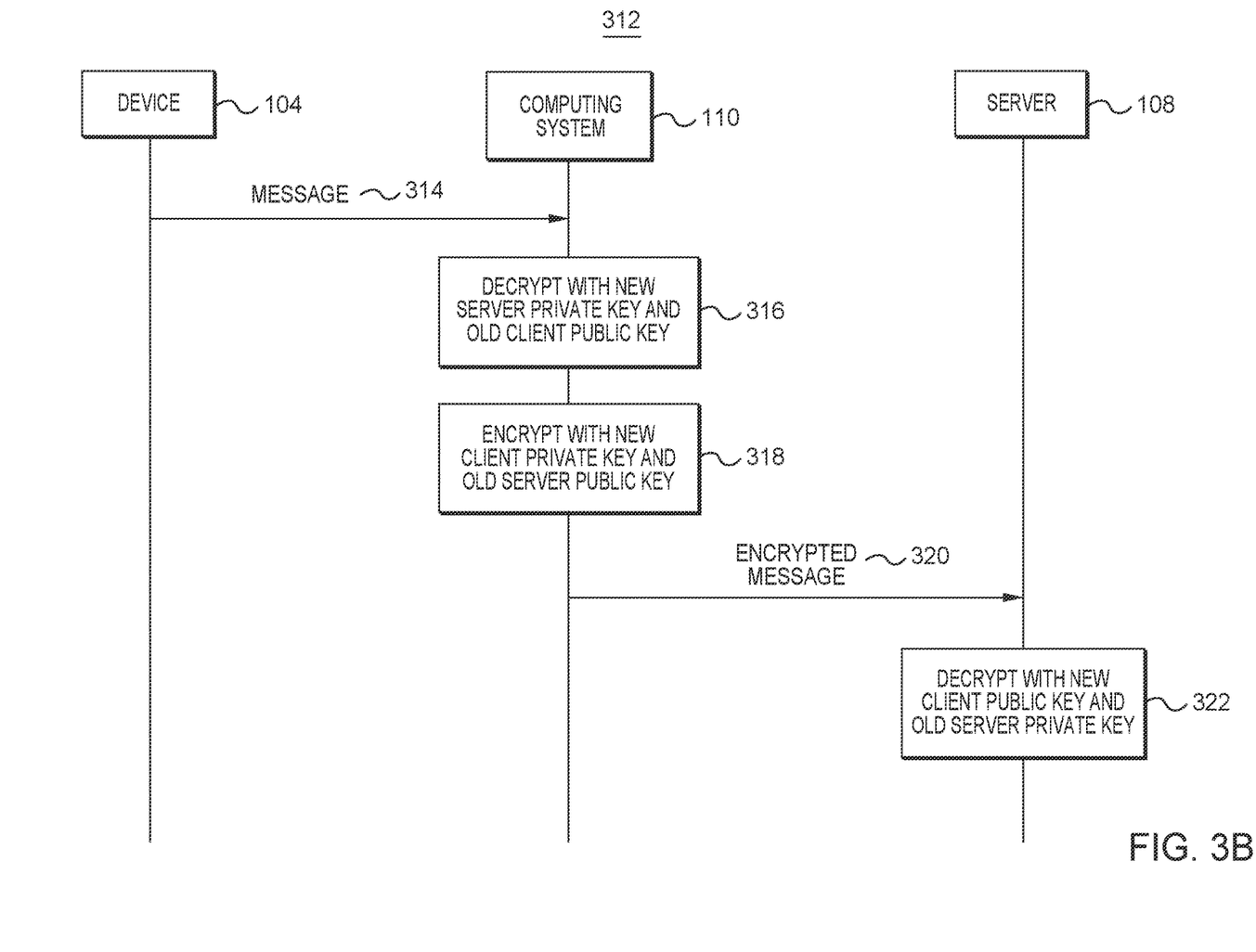
FIG. 3B illustrates an example operation performed in the system of FIG. 1.

FIG. 3B illustrates an example operation 312 performed in the system 100 of FIG. 1. The device 104, the server 108, and the computing system 110 perform the operation 312. By performing the operation 312, the computing system 110 encrypts and decrypts messages from the device 104 to the server 108.

The operation 312 begins when the device 104 communicates a message 314 to the computing system 110. The device 104 may have encrypted the message 314 using the old client private key and the new server public key. The computing system 110 receives the message 314 and decrypts the message 314 in block 316 to generate an intermediate message. The computing system 110 decrypts the message 314 using the new server private key and the old client public key. After generating the intermediate message, the computing system 110 encrypts the intermediate message in block 318 to generate an encrypted message 320. The computing system 110 encrypts the intermediate message using the new client private key and the old server public key. The computing system 110 then communicates the encrypted message 320 to the server 108. The server 108 receives the encrypted message 320 and decrypts the encrypted message 320. The server 108 decrypts the encrypted message 320 using the new client public key and the old server private key. After decrypting the encrypted message 320, the server 108 may analyze the contents of the message.

As seen in FIGS. 2A and 2B and FIGS. 3A and 3B, the computing system 110 serves as a MITM for the device 104 and the server 108. The computing system 110 facilitates a mutual authentication process for the device 104 and the server 108, in which the device 104 and the server 108 exchange certificates and keys without exposing their old private keys to the computing system 110. Additionally, the computing system 110 facilitates the exchange of messages between the device 104 and the server 108 (e.g., when the server 108 provides services to the device 104) without the device 104 and the server 108 having to expose their old private keys to the computing system 110.

Figure 4:
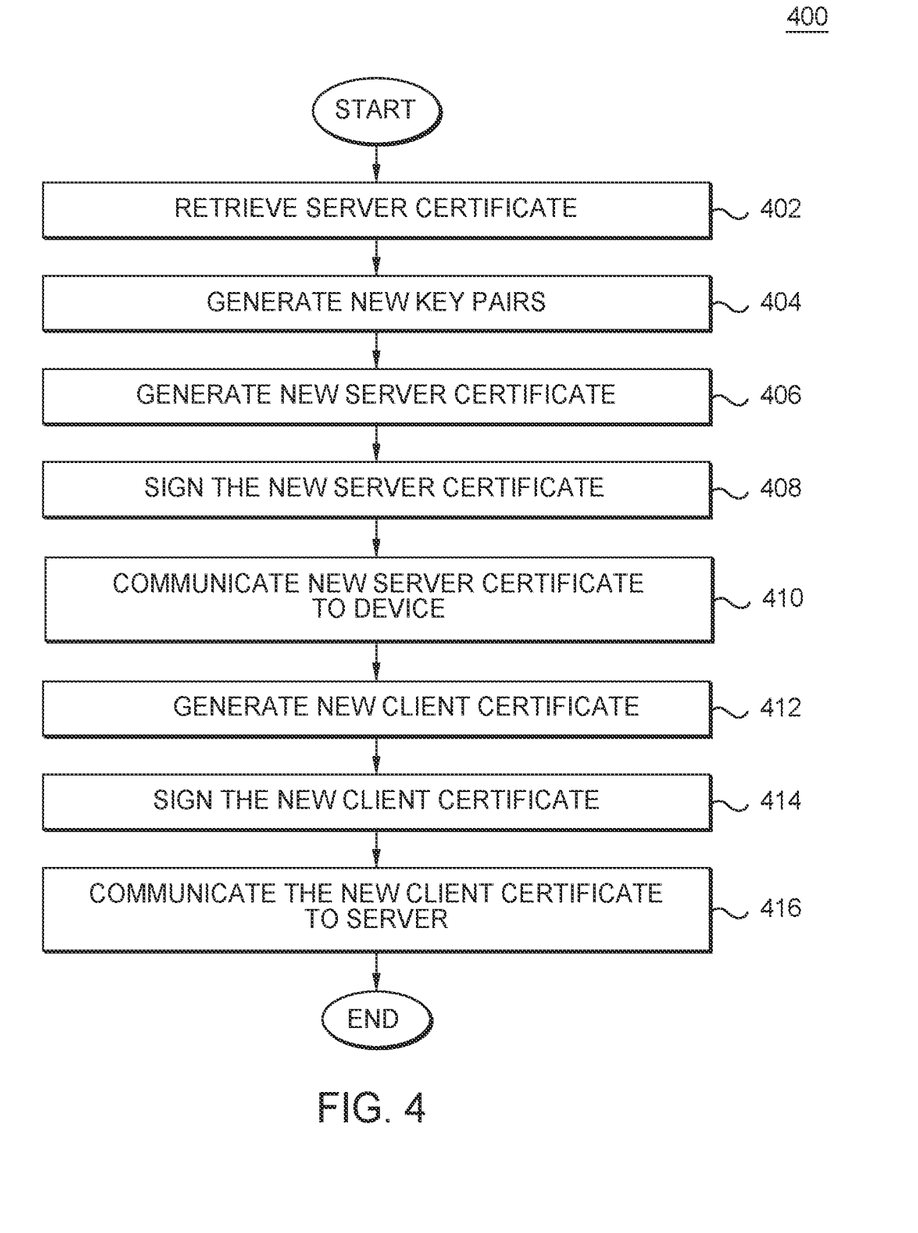
FIG. 4 is a flowchart showing an example method performed in the system of FIG. 1.

FIG. 4 is a flowchart showing example method 400 performed in system 100 of FIG. 1. In particular embodiments, the computing system 110 performs the method 400. By performing the method 400, the computing system 110 establishes a connection between the device 104 and the server 108 without the device 104 and the server 108 having to expose their private keys to the computing system 110.

In block 402, the computing system 110 retrieves a server certificate 206 from the server 108. The computing system 110 may retrieve the server certificate 206 in response to a request 202 from the device 104 to establish a connection with the server 108. The computing system 110 may communicate a request 204 to the server 108 to return the server certificate 206. The server 108 may communicate the server certificate 206 to the computing system 110.

In block 404, the computing system 110 generates new key pairs for the device 104 and the server 108. For example, the computing system 110 may generate a new server private key and a new server public key for the server 108. Additionally, the computing system 110 may generate a new client private key and a new client public key for the device 104.

In block 406, the computing system 110 generates a new server certificate 214 using information from the server certificate 206. For example, the computing system 110 may copy some of the information from the server certificate 206 into the new server certificate 214. In block 408, the computing system 110 signs the new server certificate 214. In some embodiments, the computing system 110 signs the new server certificate 214 using an intermediate signing certificate issued by a certificate authority trusted by both the device 104 and the server 108. In block 410, the computing system 110 communicates the new server certificate 216 to the device 104. In some embodiments, the computing system 110 communicates the new server public key to the device 104 along with the new server certificate 214. For example, the new server certificate 214 may include the new server public key.

In block 412, the computing system 110 generates a new client certificate 224. The computing system 110 may receive a client certificate 216 from the device 104 after the device 104 receives the new server certificate 214 communicated in block 210. The computing system 110 may copy information from the client certificate 216 into the new client certificate 224. Additionally, if the computing system 110 did not generate the new client public key and the new client private key in block 404, the computing system 110 may generate the new client private key and the new client public key when generating the new client certificate 224. In block 414, the computing system 110 signs the new client certificate 224. In particular embodiments, the computing system 110 signs the new client certificate 224 using the intermediate signing certificate issued by the certificate authority trusted by both the device 104 and the server 108. The computing system 110 then communicates the new client certificate 224 to the server 108 in block 416. In some embodiments, the computing system 110 communicates the new client public key to the server 108 along with the new client certificate 224. For example, the new client certificate 224 may include the new client public key.

Figure 5A:
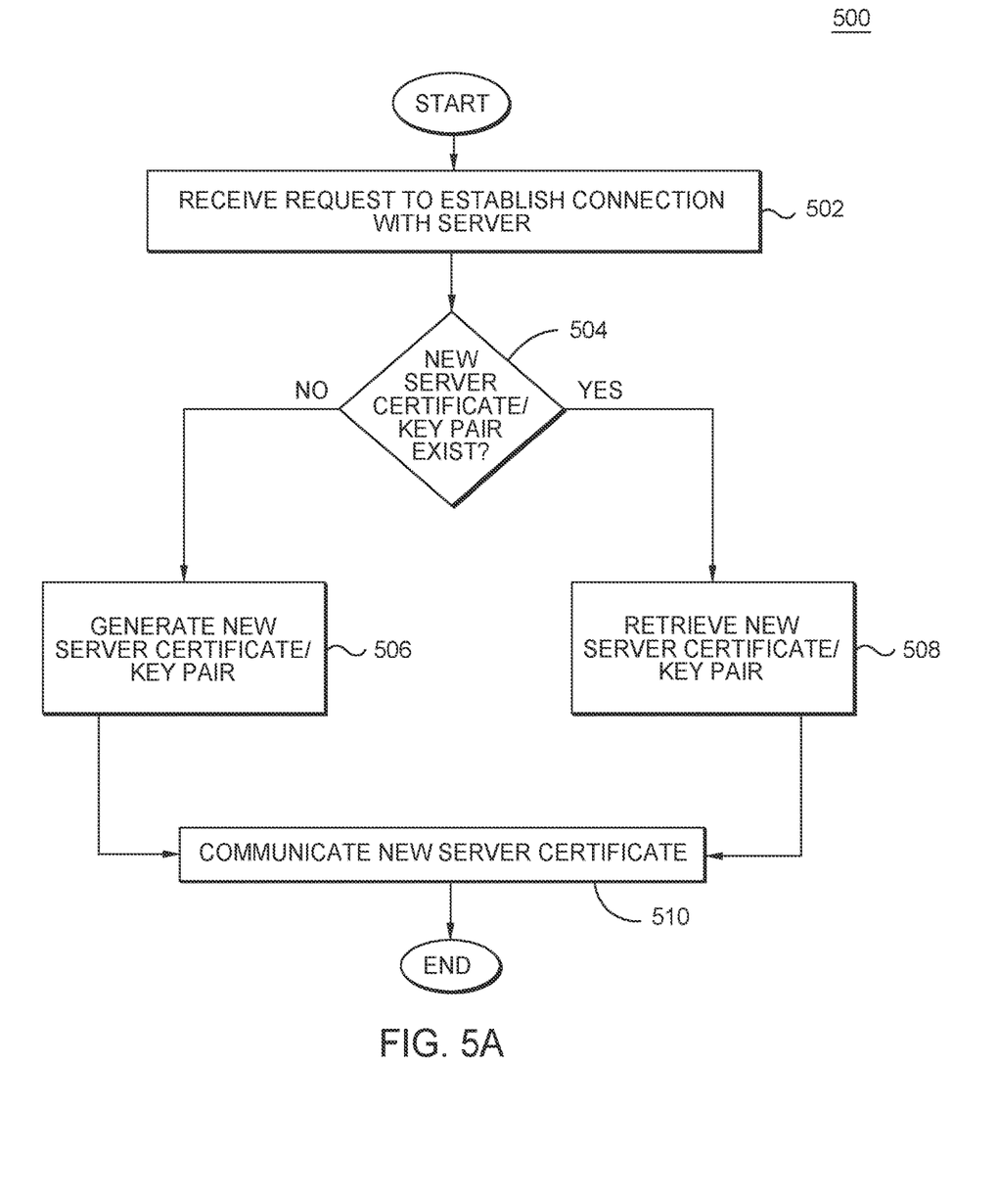
FIG. 5A is a flowchart showing an example method performed in the system of FIG. 1.

FIG. 5A is a flowchart showing an example method 500 performed in the system 100 of FIG. 1. In particular embodiments, the computing system 110 performs the method 500. By performing the method 500, the computing system 110 reuses certificates and key pairs for the server 108.

In block 502, the computing system 110 receives a request 202 to establish a connection with the server 108. The computing system 110 may receive the request 202 from a device 104 in the system 100. The computing system 110 communicates a request 204 to the server 108 to return the server certificate 206. In response, the server 108 communicates the server certificate 206 to the computing system 110.

In block 504, the computing system 110 determines whether a new server certificate 214 or key pair corresponding to the server certificate 206 already exists. For example, the computing system 110 may determine whether the computing system 110 had previously generated the new server certificate 214 and key pair corresponding to the server certificate 206 when establishing a connection between the server 108 and another device 104 in the system 100. If the new server certificate 214 and the key pair already exist, then the computing system 110 retrieves the new server certificate 214 and the key pair from a cache in block 508. If the new server certificate 214 and the key pair do not exist, then the computing system 110 generates the new server certificate 214 and the key pair in block 506 according to the operation 200 shown in FIG. 2A.

In block 510, the computing system 110 communicates the new server certificate 214 to the device 104. In some embodiments, the computing system 110 communicates the new server public key along with the new server certificate 214.

Figure 5B:
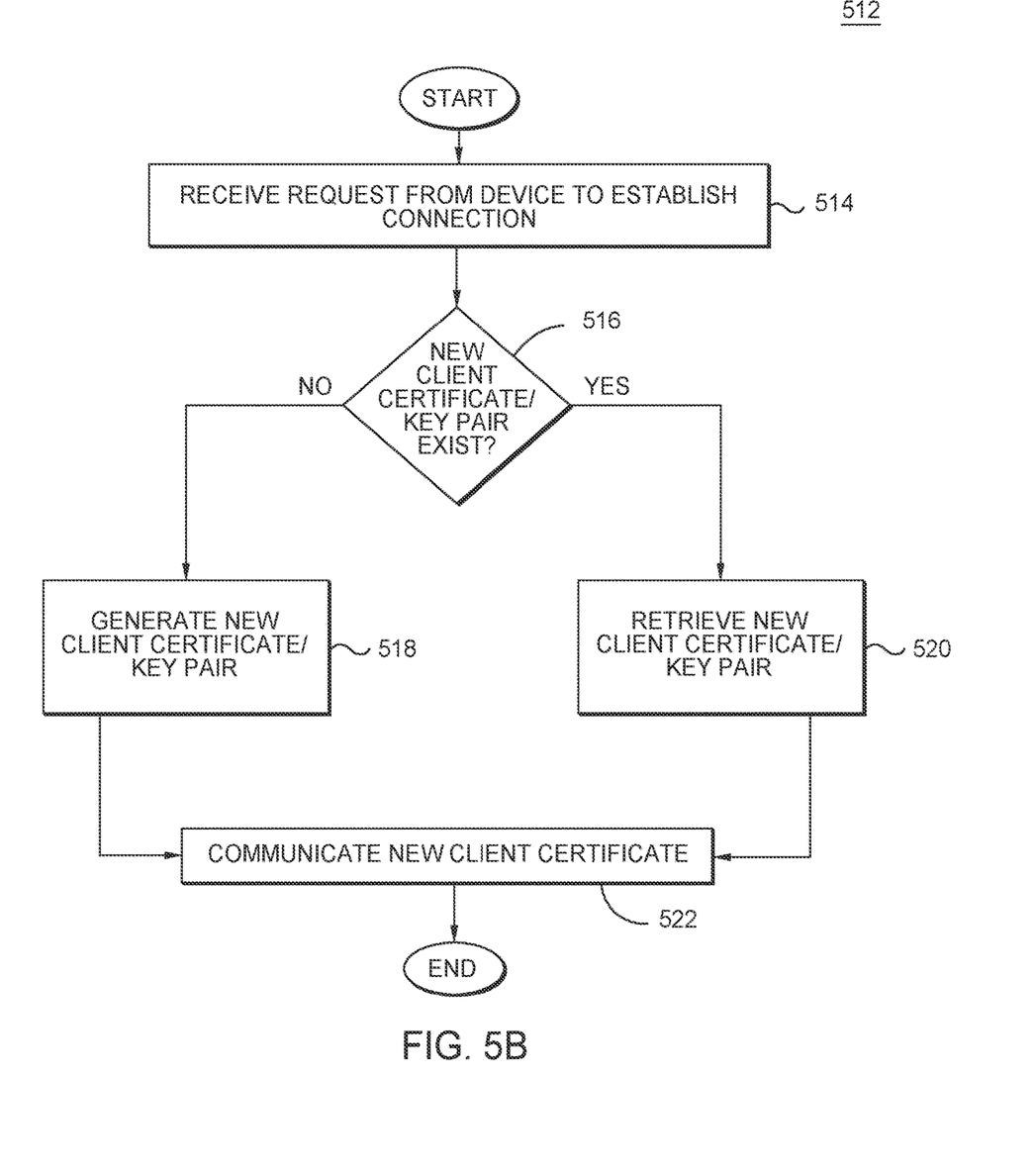
FIG. 5B is a flowchart showing an example method performed in the system of FIG. 1.

FIG. 5B is a flowchart showing an example method 512 performed in the system 100 of FIG. 1. In certain embodiments, the computing system 110 performs the method 512. By performing the method 512, the computing system 110 reuses the new client certificate 224 and key pair for the device 104.

In block 514, the computing system 110 receives a request 202 from a device 104 to establish a connection with a server 108 in the system 100. In block 516, the computing system 110 may determine whether the new client certificate 224 and key pair corresponding to the device 104 already exists. For example, the computing system 110 may have generated the new client certificate 224 and the key pair corresponding to the device 104 when the device 104 previously established a connection with another server 108 in the system 100. If the new client certificate 224 and the key pair already exist, then the computing system 110 retrieves the new client certificate 224 and the key pair from a cache in block 520. If the new client certificate 224 and the key pair do not already exist, then the computing system 110 generates the new client certificate 224 and the key pair according to the operation 200 shown in FIG. 2A in block 518. In block 522, the computing system 110 communicates the new client certificate 224 to the server 108. In some embodiments, the computing system 110 communicates the new client public key along with the new client certificate 224.

In summary, a computing system 110 performs an authentication and encryption process between a device 104 and a server 108 that allows for mutual authentication without exposing the server's 108 and the device's 104 private keys. Generally, the computing system 110 mirrors or duplicates certificates from the server 108 and the device 104 and generates new public and private key pairs for the server 108 and the device 104. The computing system 110 then communicates the new certificates and new public keys to the server 108 and the device 104. The server 108 and the device 104 may then begin encrypting traffic using the new public keys, and the computing system 110 may act as an intermediary and decrypt and re-encrypt that traffic using the new private keys. As a result, the computing system 110 can handle encrypted traffic between the device 104 and the server 108 without the device 104 and server 108 having to expose their private keys to the computing system 110, in certain embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access the computing system 110 or the server 108 or related data available in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
retrieving a server certificate from a server in response to a request from a client to negotiate a connection between the client and the server;
receiving an intermediate signing certificate from a certificate authority trusted by both the server and the client;
generating a new server public key in response to the request;
generating a new server certificate using information in the server certificate;
signing the new server certificate using the intermediate signing certificate to produce a new signed server certificate;
communicating the new signed server certificate, which includes the new server public key, to the client;
generating a new client public key;
generating a new client certificate using information in a client certificate received from the client;
signing the new client certificate using the intermediate signing certificate to produce a new signed client certificate; and communicating the new signed client certificate, which includes the new client public key, to the server to establish the connection.

2. The method of claim 1, further comprising:
generating a new client private key corresponding to the new client public key; and
generating a new server private key corresponding to the new server public key, wherein the server certificate comprises an old server public key, and wherein the client certificate comprises an old client public key.

3. The method of claim 2, further comprising:
receiving, over the connection, a message from the server for the client;
decrypting the message using the new client private key and the old server public key to produce an intermediate message;
encrypting the intermediate message using the new server private key and the old client public key to produce an encrypted message; and
communicating the encrypted message to the client over the connection.

4. The method of claim 2, further comprising:
receiving, over the connection, a message from the client for the server;
decrypting the message using the new server private key and the old client public key to produce an intermediate message;
encrypting the intermediate message using the new client private key and the old server public key to produce an encrypted message; and
communicating the encrypted message to the server over the connection.

5. The method of claim 1, further comprising:
in response to a second request from a second client to establish a second connection with the server, determining that the new signed server certificate exists; and
in response to determining that the new signed server certificate exists, communicating the new signed server certificate to the second client.

6. The method of claim 1, further comprising:
in response to a second request from the client to establish a second connection with a second server, determining that the new signed client certificate exists; and
in response to determining that the new signed client certificate exists, communicating the new signed client certificate to the second server.

7. The method of claim 1, further comprising verifying the server certificate with a certificate authority before generating the new server public key.

8. An apparatus comprising:
a memory; and
a hardware processor communicatively coupled to the memory, the hardware processor configured to:
retrieve a server certificate from a server in response to a request from a client to negotiate a connection between the client and the server;
receive an intermediate signing certificate from a certificate authority trusted by both the server and the client;
generate a new server public key in response to the request;
generate a new server certificate using information in the server certificate;
sign the new server certificate using the intermediate signing certificate to produce a new signed server certificate;
communicate the new signed server certificate, which includes the new server public key, to the client;
generate a new client public key;
generate a new client certificate using information in a client certificate received from the client;
sign the new client certificate using the intermediate signing certificate to produce a new signed client certificate; and
communicate the new signed client certificate, which includes the new client public key, to the server to establish the connection.

9. The apparatus of claim 8, the hardware processor further configure to:
generate a new client private key corresponding to the new client public key; and
generate a new server private key corresponding to the new server public key, wherein the server certificate comprises an old server public key, and wherein the client certificate comprises an old client public key.

10. The apparatus of claim 9, the hardware processor further configure to:
receive, over the connection, a message from the server for the client;
decrypt the message using the new client private key and the old server public key to produce an intermediate message;
encrypt the intermediate message using the new server private key and the old client public key to produce an encrypted message; and
communicate the encrypted message to the client over the connection.

11. The apparatus of claim 9, the hardware processor further configure to:
receive, over the connection, a message from the client for the server;
decrypt the message using the new server private key and the old client public key to produce an intermediate message;
encrypt the intermediate message using the new client private key and the old server public key to produce an encrypted message; and
communicate the encrypted message to the server over the connection.

12. The apparatus of claim 8, the hardware processor further configure to:
in response to a second request from a second client to establish a second connection with the server, determine that the new signed server certificate exists; and
in response to determining that the new signed server certificate exists, communicate the new signed server certificate to the second client.

13. The apparatus of claim 8, the hardware processor further configure to:
in response to a second request from the client to establish a second connection with a second server, determine that the new signed client certificate exists; and
in response to determining that the new signed client certificate exists, communicate the new signed client certificate to the second server.

14. The apparatus of claim 8, the hardware processor further configure to verify the server certificate with a certificate authority before generating the new server public key.

15. A method comprising:
generating a new server public key and a new client public key;
receiving an intermediate signing certificate from a certificate authority trusted by both a server and a client;
generating a new server certificate using information in a server certificate retrieved from the server;
signing the new server certificate using the intermediate signing certificate to produce a new signed server certificate;
generating a new client certificate using information in a client certificate received from the client;
signing the new client certificate using the intermediate signing certificate to produce a new signed client certificate; and
communicating the new signed client certificate, which includes the new client public key, to the server and the new signed server certificate, which includes the new server public key, to the client to establish a connection between the client and the server.

16. The method of claim 15, further comprising:
generating a new client private key corresponding to the new client public key; and
generating a new server private key corresponding to the new server public key, wherein the server certificate comprises an old server public key, and wherein the client certificate comprises an old client public key.

17. The method of claim 16, further comprising:
receiving, over the connection, a message from the server for the client;
decrypting the message using the new client private key and the old server public key to produce an intermediate message;
encrypting the intermediate message using the new server private key and the old client public key to produce an encrypted message; and
communicating the encrypted message to the client over the connection.

* * * * *